US011861554B2

(12) United States Patent
Eller

(10) Patent No.: US 11,861,554 B2
(45) Date of Patent: *Jan. 2, 2024

(54) METHODS AND SYSTEMS FOR UNIT OF USE PRODUCT INVENTORY

(71) Applicant: Express Scripts Strategic Development, Inc., St. Louis, MO (US)

(72) Inventor: Charles E. Eller, Lake Saint Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 444 days.

This patent is subject to a terminal disclaimer.

(21) Appl. No.: 15/922,851

(22) Filed: Mar. 15, 2018

(65) Prior Publication Data
US 2018/0204176 A1    Jul. 19, 2018

Related U.S. Application Data

(63) Continuation of application No. 13/618,132, filed on Sep. 14, 2012, now Pat. No. 9,978,036.
(Continued)

(51) Int. Cl.
*G06Q 10/087* (2023.01)
*G06Q 10/06* (2023.01)
(Continued)

(52) U.S. Cl.
CPC ........... *G06Q 10/087* (2013.01); *G06Q 10/06* (2013.01); *G06Q 10/083* (2013.01); *G06Q 30/0201* (2013.01); *G06Q 30/06* (2013.01)

(58) Field of Classification Search
CPC .... G06Q 10/087; G06Q 10/06; G06Q 10/083; G06Q 30/0201; G06Q 30/06
(Continued)

(56) References Cited

U.S. PATENT DOCUMENTS 4,907,699 A * 3/1990 Butcher ................ B07C 5/3412
198/349.95
5,252,814 A   10/1993 Tooley
(Continued)

FOREIGN PATENT DOCUMENTS

WO   WO-2011103872 A1 * 9/2011 ............. B65G 1/137

OTHER PUBLICATIONS

Augusto, Vincent; Xie, Xiaolan. Redesigning pharmacy delivery processes of a health care complex. Health Care Management Science; New york vol. 12, Iss. 2, Jun. 2009. (Year: 2009).*

(Continued)

*Primary Examiner* — Florian M Zeender
*Assistant Examiner* — Fawaad Haider
(74) *Attorney, Agent, or Firm* — Stinson LLP

(57) ABSTRACT

Method and systems for product inventory are described. In one embodiment, an inventory surface unit retains a plurality of products in an unordered state. An inventory identification unit acquires information for an orientation, and location of the plurality of products on the inventory surface unit. The inventory identification unit is disposed above the inventory surface unit. An inventory pick unit is adapted to pick a product among the plurality of products from the inventory surface unit based on the orientation and location acquired by the inventory identification unit. The inventory pick unit is disposed proximal the inventory surface unit, and the inventory pick unit is communicatively connected to the inventory identification unit. Additional methods and systems are disclosed.

21 Claims, 13 Drawing Sheets

Related U.S. Application Data

(60) Provisional application No. 61/534,562, filed on Sep. 14, 2011.

(51) Int. Cl.
   *G06Q 30/0201* (2023.01)
   *G06Q 10/083* (2023.01)
   *G06Q 30/06* (2023.01)

(58) Field of Classification Search
   USPC .......................................................... 705/28
   See application file for complete search history.

(56) References Cited

U.S. PATENT DOCUMENTS

| | | | |
|---|---|---|---|
| 5,468,110 A * | 11/1995 | McDonald | B65G 1/1371 414/268 |
| 5,771,657 A * | 6/1998 | Lasher | B65B 61/20 53/493 |
| 6,494,017 B1 | 12/2002 | McGrath et al. | |
| 7,844,104 B2 | 11/2010 | Tropf | |
| 7,957,580 B2 | 6/2011 | Ban et al. | |
| 7,957,583 B2 | 6/2011 | Boca et al. | |
| 8,145,353 B1 | 3/2012 | Cotner | |
| 8,215,540 B2 * | 7/2012 | Szesko | G16H 20/13 235/475 |
| 8,418,830 B2 * | 4/2013 | Salamanca | B25J 9/0093 414/730 |
| 2005/0192705 A1 | 9/2005 | Pinney et al. | |
| 2007/0177790 A1 * | 8/2007 | Ban | B25J 9/1697 382/153 |
| 2008/0195247 A1 * | 8/2008 | Mallett | G16H 40/67 700/225 |
| 2009/0288996 A1 * | 11/2009 | Shafer | B65G 1/1378 209/546 |
| 2011/0184751 A1 | 7/2011 | Holmes | |
| 2013/0092700 A1 | 4/2013 | Braunstein | |
| 2013/0110280 A1 * | 5/2013 | Folk | B25J 9/1697 700/215 |

OTHER PUBLICATIONS

Maloney, Lawrence D. Meet Your Robot 'Pharmassistant'. Design News, suppl. Medical Technology; Manhassett vol. 62, Iss. 18, (Dec. 10, 2007). (Year: 2007).*

McMahon, Jim. Robotics, smart conveying streamline specimen handling at national reference lab. Laboratory Product News; Don Mills vol. 39, Iss. 4, (Jun. 2009): 10-11. (Year: 2009).*

Keshavarzmanesh, Shadi. Increasing adaptability of assembly process planning and control using Function Block methodology, The University of Western Ontario (Canada), ProQuest Dissertations Publishing, 2010.

* cited by examiner

METHODS AND SYSTEMS FOR UNIT OF USE PRODUCT INVENTORY

CROSS-REFERENCE TO RELATED APPLICATIONS

This application is a continuation of U.S. patent application Ser. No. 13/618,132, filed on Sep. 14, 2012; said application claims priority and benefit under 35 U.S.C. § 119(e) to U.S. Provisional Patent Application No. 61/534,562, filed on Sep. 14, 2011. The entire disclosures of said applications are incorporated herein by reference.

FIELD

The field relates to unit of use product inventory, and more particularly to improving accessibility and storage of unit of use products.

BACKGROUND

High volume pharmacies process and fulfill a large number of prescriptions per day. These pharmacies often rely on automated systems to process, fill, and pack one or more prescriptions together for delivery to a patient. Some of the automated systems are configured to dispense unit of use products. A unit of use product is made for dispensing a drug to a patient without product packaging modification (or with minimal product packaging modification) except for labeling with patient information. Unit of use products can include a full course of medicine to be taken by a patient, for example, an entire prescription (e.g., a thirty-day supply, a sixty-day supply, or a ninety-day supply). The unit of use products contain known quantities of medication in packages that are closed and sealed by, for example, the pharmaceutical manufacturer. Dispensing unit of use products greatly limits the need for manual or automated filling of open prescription containers with drug that are first counted and then sealed at the pharmacy.

Despite the decrease in manual or automated filling, the high volume pharmacies still use skilled labor to dispense the unit of use products to patients. For example, pharmacy technicians must record receipt of shipments of unit of use products. The unit of use products are warehoused for a period and then moved to a production floor for temporary storage. The pharmacy depends on labor to store and move the products for eventual dispensing.

For automated dispensing of unit of use products, current machines have dedicated channels for each unit of use product. When many unit of use products are to be dispensed, technicians configure an entire array of channels, each dedicated to one type of unit of use product. The dedicated channels are typically configured to fit the dimensions of the particular unit of use product to avoid an incorrect orientation that causes a machine error and inhibits automated dispensing. Even if all of the dedicated channels are designed, manufactured and configured perfectly for the unit of use products, the pharmacy utilizes labor to stock and restock the dedicated channels. Additionally, inventory of each of the unit of use products must be stocked in every channel to avoid inhibiting the automation.

DETAILED DESCRIPTION

Example methods and systems for unit of use product inventory are described. In the following description, for purposes of explanation, numerous specific details are set forth in order to provide a thorough understanding of example embodiments. It will be evident, however, to one of ordinary skill in the art that embodiments of the invention may be practiced without these specific details.

Generally, the systems and methods lower the cost of labor because the unit of use products are placed on a movable surface area after being received by a pharmacy and later dispensed from the same surface area. The inventory is visible because the inventory is stored in a generally unordered state on the surface area, not in shelves or channels. The unordered state of the unit of use products generally reflects that the unit of use products are not arranged according to specific principles, procedures, precepts, or rules. Stated another way, there is generally no repeatable condition of logical or comprehensible arrangement among the unit of use product inventory.

The systems and methods for unit of use product inventory do not rely on dedicated locations and preconfigured orientations. The systems and methods further provide a flexible pharmacy environment that is free from strict configurations and rigid inventory management, which can include defined, ordered storage area for respective type of inventory items.

Figure 1:
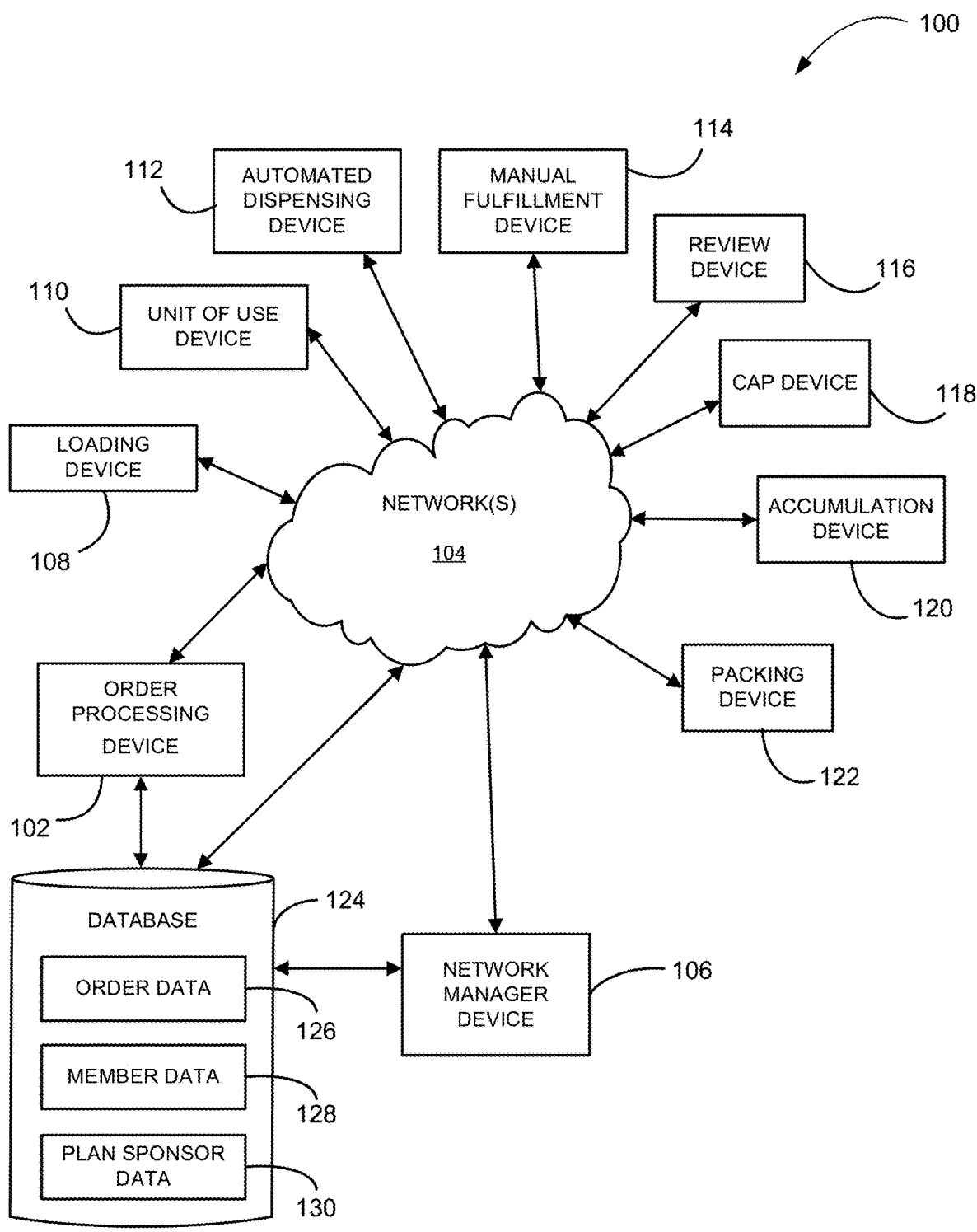
FIG. 1 is a block diagram of an example system, according to an example embodiment.

FIG. 1 is a block diagram of an example system 100, according to an example embodiment. While the system 100 is generally described as being deployed in a high volume pharmacy, the automated filling system 100 may otherwise be deployed. The system 100 may include an order processing device 102 in communication with a network manager device 106 over a network 104.

The order processing device 102 may receive information about prescriptions being filled at a pharmacy in which the order processing device 102 is deployed. The order processing device 102 may track a prescription order as it is fulfilled. The order processing device 102 may make routing decisions and/or order consolidation decisions for a prescription order. The order processing device 102 may operate on its own or in combination with the network manager device 106.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The network manager device 106 is a device operated by an entity at least partially responsible for creation and/or management of the pharmacy benefit. While the network manager operating the network manager device 106 is typically a pharmacy benefit manager (PBM), other entities may operate the network manager device 106 either on behalf of themselves, the PBM, or another entity. The network manager device 106 may include a processor, memory to store data and instructions, and a communication device.

Some of the operations of the PBM that operates the network manager device 106 may include the following. A member of a pharmacy benefit plan administered by or through the PBM (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM. The member's co-pay may be based on a flat co-pay (e.g., $10), coinsurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication functions including verifying the eligibility of the member, reviewing the formulary of the member to determine appropriate co-pay, coinsurance, and deductible for the prescription drug, and performing a drug utilization review (DUR) on the member. The PBM then adjudicates the claim associated with the prescription drug and provides a response to the pharmacy following performance of the aforementioned functions. As part of the adjudication, the client (or the PBM on behalf of the client) ultimately reimburses the pharmacy for filling the prescription drug when the prescription drug was successfully adjudicated. The aforementioned adjudication functions generally occur before the co-pay is received and the prescription drug dispensed. However, the operations may occur simultaneously, substantially simultaneously, or in a different order. In addition, more or less adjudication functions may be performed as part of the adjudication process. Adjudication may be performed through the use of a machine, such as a computer system.

The amount of reimbursement paid to the pharmacy by a plan sponsor and/or member may be based at least in part on the type of pharmacy network in which the pharmacy is included. Other factors may be used to determine the reimbursement amount in addition to the type of pharmacy network. The above methodologies may be implemented by executing instructions in the network manager device 106.

The system 100 may include a loading device 108, a unit of use device 110, an automated dispensing device 112, a manual fulfillment device 114, a review device 116, a cap device 118, an accumulation device 120 and/or a packing device 122.

The loading device 108 may load prescription containers by a robotic arm, pick and place mechanism, or the like. In one embodiment, the loading device 108 has robotic arms or pickers to grasp a prescription container and move it to and from a pallet. The pallet may be located on a conveyor assembly.

The unit of use device 110 may temporarily store, monitor, label and/or dispense unit of use products.

The automated dispensing device 112 includes one or more devices that dispense prescription drugs or pharmaceuticals into prescription containers in accordance with one or more prescription orders. Various automated dispensing systems are available commercially such as e.g., the system sold under the trademark OPTIFILL by AmerisourceBergen Corporation.

The manual fulfillment device 114 provides for manually fulfilling prescriptions. In general, a manual fulfillment may include operations at least partially performed by a pharmacist or pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter). In some embodiments, the automated fulfillment is integrated with the manual fulfillment operations. Certain automated fulfillment may be performed before manual fulfillment and vice versa. The automated fulfillment for a prescription may be paused to allow for the manual fulfillment to be completed. Once the devices receive an input that manual fulfillment is complete, then the automated fulfillment is released and fulfillment proceeds automatically.

The review device 116 may process prescription containers to be reviewed by a pharmacist. Fulfilled prescriptions may be reviewed and/or verified by a pharmacist, as may be required by state or local law. In other embodiments, prescriptions are reviewed and/or verified for quality assurance. A pharmacist or other licensed person who may dispense certain drugs in compliance with local and/or other laws may operate the review device 116 and visually inspect a prescription container that has been filled with a prescription drug. The pharmacist may review, verify, and/or evaluate drug quantity, drug strength, and/or drug interaction concerns, or otherwise perform pharmacist services.

The cap device 118 may be used to cap a prescription container. In some embodiments, the cap device 118 may provide a type of cap in accordance with a patient preference (e.g., a preference regarding child resistance), a client preference, prescriber preference, etc.

The accumulation device 120 accumulates various prescription drugs in a prescription order. The accumulation device 120 may accumulate prescription containers from various areas of the high volume fulfillment center. For example, the accumulation device 120 may accumulate prescription containers from the unit of use device 110, automated dispensing device 112, the manual fulfillment device 114, and the review device 116.

The packing device 122 packages a prescription order in preparation for shipping the order. The packing device 122 may box or bag the fulfilled prescription order for delivery. The packing device 122 may further place inserts into the box or bag. The packing device 122 may label the box or bag with the address and a recipient's name. The packing device 122 may sort the box or bag for mailing in an efficient manner (e.g., sort by delivery address). The packing device 122 may be used in conjunction with the unit of use device 110, as described below.

While the system 100 in FIG. 1 is shown to include single devices 102, 106-122 multiple devices may be used. The devices 102, 106-122 may be the same type of device or may be different device types. When multiple devices are present, the multiple devices may be of the same device type or may be a different device type. Moreover, system 100 shows a single network 104; however, multiple networks can be used. The multiple networks may communicate in series with each other to link the devices 102, 106-122 or in parallel to link the devices 102, 106-122. Multiple devices may share processing and/or memory resources. The devices 102-122 may be located in the same area or in different locations. For example, the devices 102, 106-122 may be located in a building or set of adjoining buildings. The devices 102, 106-122 may be interconnected (e.g. by conveyors), networked, or otherwise in contact with one another or integrated with one another.

In some embodiments, at least some of the functionality of the order processing device 102 may be included in the network manager device 106. In other embodiments, at least some of the functionality of the order processing device 102 may be included in the unit of use device 110 and vice versa.

The order processing device 102 may be in a client-server relationship with the network manager device 106, a peer-to-peer relationship with the network manager device 106, or in a different type of relationship with the network manager device 106.

The order processing device 102 and/or the network manager device 106 may be in communication directly (e.g., through local storage) and/or through the network 104 (e.g., in a cloud configuration or software as a service) with a database 124 (e.g., as may be retained in memory or otherwise). The database 124 may store order data 126, member data 128 and/or plan sponsor data 130.

The order data 126 may include data related to the order of one or more prescriptions, including the type (e.g. drug name and strength), and quantity of each prescription in the order. The order data 126 may also include data used for completion of the prescription, such as prescription materials. Prescription materials are a type of order materials that include an electronic copy of information regarding the prescription drug for inclusion with the fulfilled prescription. The prescription materials may include electronic information regarding drug interaction warnings, recommended usage, possible side effects, expiration date, date of prescribing, etc.

The member data 128 includes information regarding the members associated with the benefit manager. Examples of the member data 128 include name, address, telephone number, e-mail address, prescription drug history, and the like. The member data 128 may include a client identifier that identifies the client associated with the member and/or a member identifier that identifies the member to the client. The member data 128 may include a member identifier that identifies the client associated with the patient and/or a patient identifier that identifies the patient to the client. The member data 128 may also include, by way of example, dispensation preferences such as type of label, type of cap, message preferences, language preferences, or the like. The member data 128 may be accessed by the devices 102, 106-122 to obtain the necessary information for fulfilling the prescription and shipping the prescription drugs.

The plan sponsor data 130 includes information regarding the clients of the benefit manager. Examples of the plan sponsor data 130 include company name, company address, contact name, contact telephone number, contact e-mail address, and the like.

Figure 2:
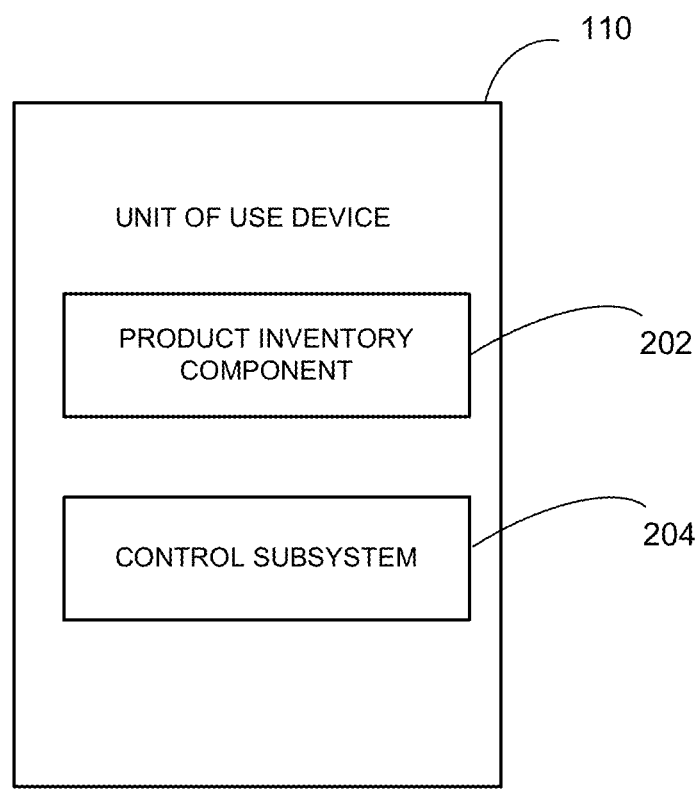
FIG. 2 is a block diagram of an example unit of use device that may be deployed within the system of FIG. 1, according to an example embodiment.

FIG. 2 illustrates the unit of use device 110, according to an example embodiment. The unit of use device 110 may be used by a device operator to manage and dispense product inventory. The unit of use device 110 may be deployed in the system 100, or may otherwise be used.

The unit of use device 110 may include a product inventory component 202 and/or a control subsystem 204. The product inventory component 202 enables the device operator to temporarily store, monitor, label, and/or dispense unit of use products. The control subsystem 204 enables a device operator to control the temporary storage, monitoring, labeling, and/or dispensing of unit of use products.

Figure 3:
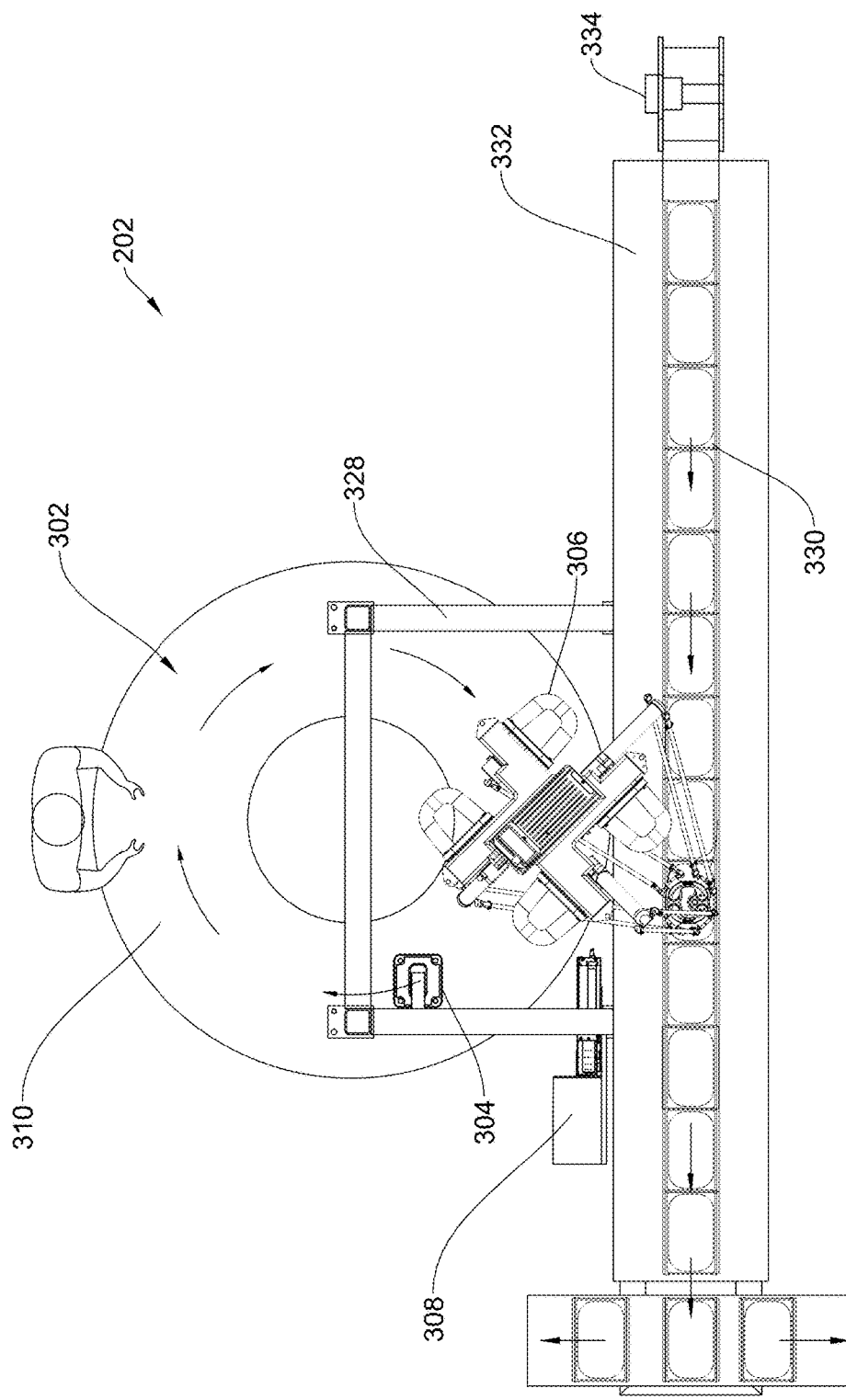
FIG. 3 is a schematic representation of a product inventory subsystem that may be deployed within the unit of use device of FIG. 2, according to an example embodiment.
Figure 4:
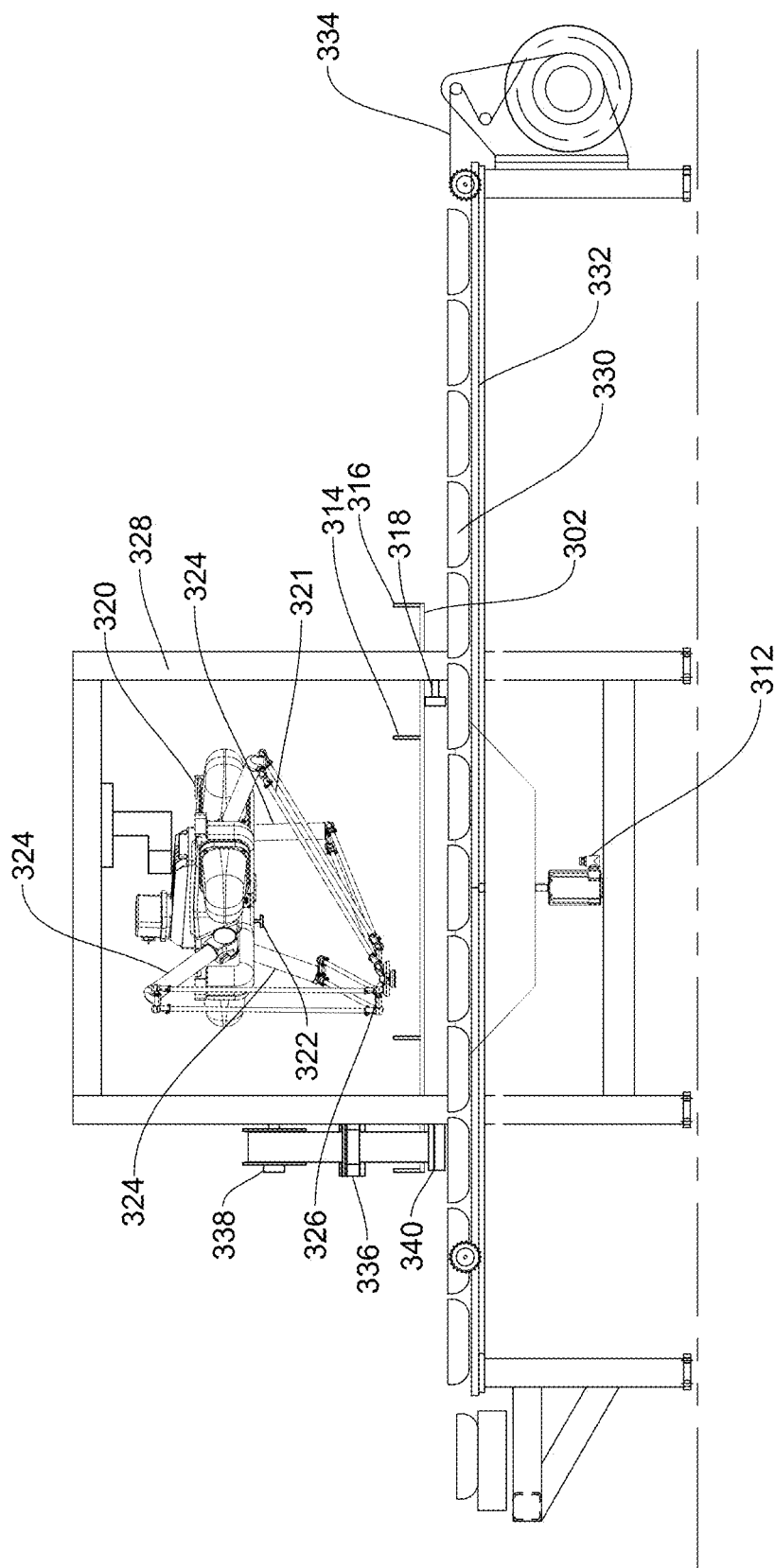
FIG. 4 is a side view of the product inventory subsystem of FIG. 3, according to an example embodiment.

FIGS. 3 and 4 illustrate a product inventory component 202 according to an example embodiment. The product inventory component 202 includes an inventory surface unit 302, inventory identification unit(s) 304, an inventory pick unit 306, and a label unit 308. The inventory surface unit 302 stores many different types of unit of use products that are unordered and varying in size and shape. The inventory identification unit 304 is disposed at the inventory surface unit 302 to acquire images of the unit of use products as the inventory surface unit 302 retains the products. The images are used to identify the type, location, and orientation of the unit of use products. The location may refer to the location of a specific one of the unit of use products on the inventory surface unit 302. The orientation may refer to a specific orientation of one of the unit of use products on the inventory surface unit 302 relative to a defined coordinate system. The coordinate system may be relative to the inventory surface unit 302, the center of rotation of a movable surface area 310, or other relative coordinate systems. In an example embodiment, the location of any specific unit of use product may be defined by an angle from an axis of a set coordinate system centered at the center of rotation of a moveable surface area 310 of the inventory surface unit 302 and a radial distance from the center of this coordinate system, for example a vector. The location would further be defined by the height of the product determined by the orientation of the product. The orientation, in this example embodiment, may be defined by the angles relative to a coordinate system stationary with respect to moveable surface area 310 of the inventory surface unit 302, containing for example angles defining the products orientation in three dimensional space. Using the identified type, location and orientation, the inventory pick unit 306 picks the desired unit of use product from the inventory surface unit 302. The inventory pick unit 306 moves the picked unit of use product to the label unit 308. The inventory pick unit 306 then presents the unit of use product to the label unit 308 for patient-specific labeling.

The inventory surface unit 302 has a movable surface area 310 supporting the unit of use product inventory and an actuator 312 for moving the movable surface area 310. The movable surface area 310 repeatedly passes the inventory by the inventory identification unit 304 and the inventory pick unit 306. Thus, as product inventory changes, the inventory identification unit 304 updates the type, location and/or orientation of new or disturbed unit of use products during the repeated passes. A disturbed unit of use product can be a unit of use product that had its location and orientation change for various reasons. The location and orientation are determined by the inventory identification unit 304 and stored (e.g., in a computer readable memory). A unit of use product on the inventory surface unit 302 may be disturbed by operation of the inventory pick unit 306 or the addition of new unit of use product(s). In the embodiment illustrated in FIG. 3, the inventory surface area 310 is circular shaped such that movement of the surface area 310 in a single direction repeatedly passes the inventory of unit of use products by the inventory identification unit 304 and the inventory pick unit 306. However, other types of shapes and designs may also be used.

The moveable surface area 310 can be an annulus, with an open center in which the label unit 308 may be positioned. At least a portion of the inventory pick unit 306 may be proximal the movable surface area 310. Specifically, the inventory pick unit 306 may have a base positioned outside the outer perimeter of the moveable surface area 310 such that it can extend over the surface area 310 to contact a unit of use product. As is illustrated in FIG. 3, the inventory pick unit 306 can be mounted above the inventory surface unit 302 so as to be proximal the movable surface area 310, limiting conflict between the two devices while allowing inventory pick unit 306 to reach a larger section of the moveable surface area 310.

The inventory surface unit 302 may include, in some embodiments, an inner guard member 314 and an outer guard member 316 that extend upwardly from the surface area 310 along its inner and outer perimeter, respectively (e.g., at its small radius and its large radius respectively). The inventory surface unit 302 may accommodate thousands of unit of use products, for example, within the inner and outer guard members 314, 316 at any time. The inner and outer guard members 314, 316 contain the unit of use products within the surface area 310 of the inventory surface unit 302. The inner and outer guard members 314, 316 guard against unit of use products falling off the surface area 310 of the inventory surface unit 302.

The inventory identification unit 304 and/or the inventory pick unit 306 may move along a track section (not shown). This provides greater mobility so that the inventory identification unit 304 and/or the inventory pick unit 306 do not have to wait for unit of use products to pass within range on the movable surface area 310. The label unit 308 can also be positioned on a track (not shown) to move in synchronicity with the inventory pick unit 306.

The inventory surface unit 302 further includes an encoder 318 that tracks movement of the surface area 310. The encoder 318 typically engages the inventory surface unit 302 and measures distance that the unit of use products have moved. The encoder 318 may further operate to measure the rotational speed and position of the moveable surface area 310 of the inventory surface unit 302. In some embodiments the encoder 318 may be below the surface area 310. Moreover the encoder 318 may be positioned at a radial distance along the surface area 310. An example of the encoder 318 may be a shaft or wheeled encoder, such as those sold by Photocraft, Inc., Elburn, IL.

The inventory identification unit 304 is positioned at or above the inventory surface unit 302 to have a clear view of the unit of use products at the surface area 310. The inventory identification unit 304 is configured to obtain images of the unit of use products on the surface area 310. Using image analysis, performed on the image data obtained by the inventory identification unit 304, the location and position angle for each visible unit of use product on the surface area 310 is determined. The inventory identification unit 304 provides two-dimensional image data about the unit of use products at the surface area 310. However, in some embodiments, three-dimensional image data may also be analyzed. The type of unit of use product and its dimensions, center of gravity and weight, for example, are determined by reading a bar code on an exterior of the unit of use product with the inventory identification unit 304. Reading the bar code identifies the unit of use product and the product's attributes are referenced in a table or database, for example. The bar code can be read using the inventory identification unit 304 and image analysis software to recognize and read bar codes. In some embodiments, the inventory identification unit 304 may include a bar code reader strategically located to capture the bar codes on the unit of use products. The inventory identification unit 304 still captures image data but coordinates the captured image data with the bar code scanned either at the same time or in the same location on the surface area 310. In other embodiments, the bar code may not be present on the unit of use product or may not be visible from the location of the inventory identification unit 304. In this instance, technology similar to facial recognition technology, in which images could be compared, may be used for identification of the unit of use product. Using this type of technology allows unit of use products to be added to inventory surface unit 302 without consideration of the bar code's orientation.

The inventory pick unit 306 is configured to obtain the unit of use product from the surface area 310. The inventory pick unit 306 includes a programmable picking apparatus 320 and a supplemental image camera 322. The programmable picking apparatus 320 is configured to obtain the unit of use product via grasping, pushing, gripping, suction, or adhesive, for example. The programmable picking apparatus 320 may include a conventional industrial robot such as those available from KUKA Robotics, Corp., Clinton Township, MI Other examples of usable robots include the Quattro Parallel robot, the SCARA robot or the 6-axis robot, all from Adept Technology, Inc., Pleasanton, CA The programmable picking apparatus 320 includes movable arm(s) 324 with a picker 326 attached to one end of the movable arm(s) 324. The picker 326 may include fingers for grasping, a suction device with vacuum suction cup(s), or an adhesive portion, for example.

The inventory pick unit 306 is sized and positioned to obtain and then guide the unit of use product to the label unit 308 and release it at a separate location. Specifically, support members 328 support and secure the programmable picking apparatus 320 in a location to facilitate picking unit of use products on demand to fill open orders. The movable arm(s) 324 extends toward the label unit 308 after lifting the unit of use product from the surface area 310. The picker 326 then guides the unit of use product to the label unit 308 and releases at a separate location, such as a location for preparing to ship (e.g. the packing device 122). In other embodiments, the inventory pick unit 306 may release the unit of use product to the label unit 308. Additional operations between lifting the unit of use product from the surface area 310 and guiding to the label unit 308, such as a bar code scan, may be performed. In an example embodiment, the movable arm(s) 324 may include multiple arm units that move the pick device in at least one plane (e.g., forward and backward in both the X and Y directions). In another example embodiment, the movable arm(s) 324 move in three dimensions (e.g., forward and backward, in both the X and Y directions, and up and down in the Z direction).

The supplemental image camera 322 of the inventory pick unit 306 is a camera device disposed at the programmable picking apparatus 320. In some embodiments, the supplemental image camera 322 is connected to the movable arm(s) 324 or picker 326 of the programmable picking apparatus 320. The supplemental image camera 322 is connected to the inventory identification unit 304 to communicate image data to verify a position of the unit of use product and confirm that the programmable picking apparatus 320 has obtained the unit of use product. In some embodiments, the inventory identification unit 304 may be located near or within a picking zone of the inventory pick unit 306 and the supplemental image camera 322 may not be used as part of the inventory pick unit 306. The inventory identification unit 304 may be located in a position, for example, above the inventory surface unit 302, such that the inventory identification unit 304 can image the entire inventory surface area 310 located on the inventory surface unit 302. The location and orientation of each unit of use product is tracked in real time, and new unit of use products are tracked as they are deposited on the inventory surface unit 302.

The label unit 308 is disposed in proximity to the inventory pick unit 306 to receive the unit of use product picked from the inventory surface unit 302. In the case where the inventory pick unit 306 moves on track section, the label unit 308 may be on a track section, e.g., adjacent the inner annular edge of the surface area 310, and the label unit 308 can synchronously travel with the inventory pick unit 306. The label unit 308 is a labeler that prints a patient-specific label and adheres the label to the unit of use product. In some embodiments, the label unit 308 receives the patient-specific label from another printer and applies the label to the unit of use product. In other embodiments, the inventory pick unit 306 and the label unit 308 may work conjunctively to adhere the patient-specific label. The patient-specific label includes patient information, drug name, dosage, instructions, name of pharmacy, prescription number, and other identifying indicia. The label unit 308 turns the unit of use product into a patient-specific unit of use product with the application of the label to the exterior—as is further explained below.

The inventory pick unit 306 may move the unit of use product from the inventory surface unit 302 or the label unit 308 to the packing device 122. In the embodiment of FIG. 3, the packing device 122 is adjacent the product inventory component 202. The packing device 122 may have multiple pouches or bins 330 to receive unit of use products. The pouches 330 may be located on a conveyor 332 and moved to other devices 112-120. In the embodiment of FIG. 3, the unit of use products delivered by the inventory pick unit 306 are packaged for shipping and placed in the pouches 330. The label unit 308 is removed from FIG. 4 to show that the packing may use a lower film dispenser 334, a printer 336, an upper film dispenser 338 and a heat sealer 340. The lower film dispenser 334 provides a film which is formed into the pouch 330. The unit of use product is set onto the film when dropped over the pouch 330 by the inventory pick unit 306. The printer 336 prints addresses onto the film dispensed by the upper film dispenser 338. The printed film is then laid over the top of the unit of use product and the lower film. The heat sealer 340 may seal the edges and cut excess film. The sealed unit of use products are then conveyed away in the pouches 330. The lower film dispenser 334, the printer 336, the upper film dispenser 338 and the heat sealer 340 are removed from FIG. 3 for clarity.

Figure 5:
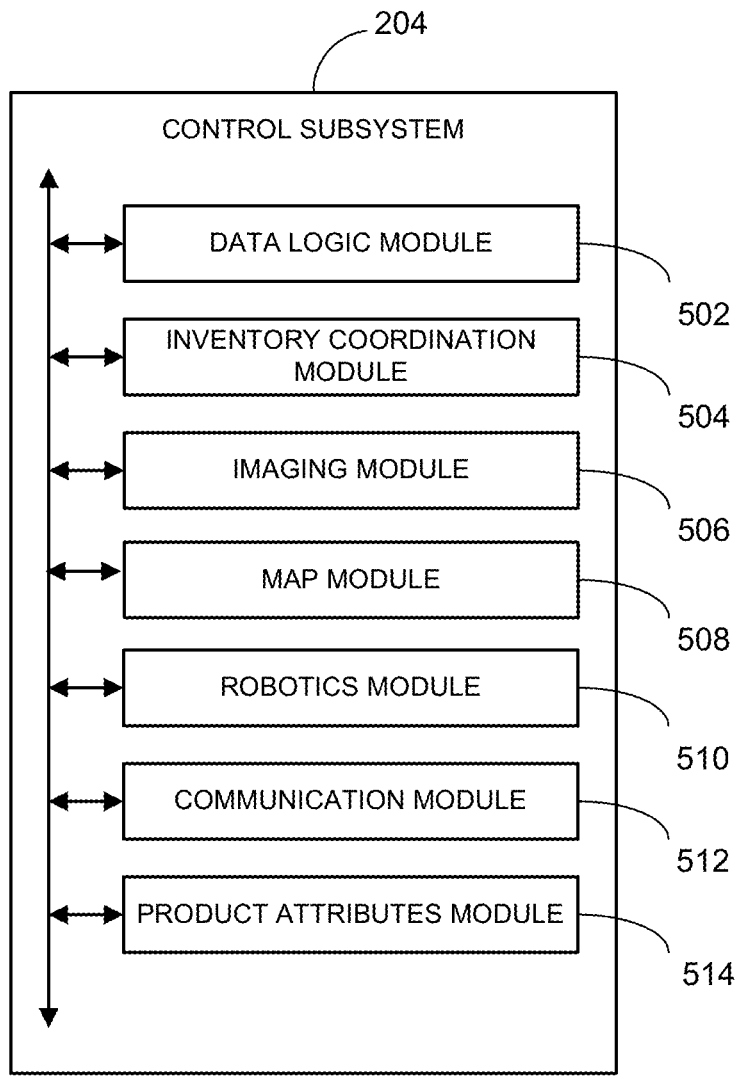
FIG. 5 is a block diagram of an example control subsystem that may be deployed in the unit of use device of FIG. 2, according to an example embodiment.

FIG. 5 illustrates an example control subsystem 204 connected to the inventory surface unit 302, the inventory identification unit 304, the inventory pick unit 306 and the label unit 308. The control subsystem 204 controls various functions of the inventory surface unit 302, the inventory identification unit 304, the inventory pick unit 306 and the label unit 308.

One or more modules are communicatively coupled and included in the control subsystem 204. The modules of the control subsystem 204 that may be included are a data logic module 502, an inventory coordination module 504, an imaging module 506, a map module 508, a robotics module 510, a communication module 512 and/or a product attributes module 514. Other modules may also be included.

In some embodiments, the modules of the control subsystem 204 may be distributed so that some of the modules are partially deployed in the order processing device 102 and/or some modules are partially deployed in the network manager device 106. In one embodiment, the modules are deployed in memory and executed by a processor coupled to the memory. The functionality contained within the modules 502-514 may be combined into a lesser number of modules, further divided among a greater number of modules, or redistributed among existing modules. Other configurations including the functionality of the modules 502-514 may be used.

The data logic module 502 processes incoming order information and prepares outgoing communications regarding the filled orders. The order for unit of use product is patient-specific. Picking the unit of use product can be considered a patient-specific pick in terms of data logic. However, physical creation of the patient-specific unit of use product does not occur until the label unit 308 applies the patient-specific label. The data logic module 502 is communicatively connected to the label unit 308 and provides patient-specific information about the order that is needed to print the label. The data logic module 502 can also monitor an order as it is filled. For example, if three unit of use products are needed to fill one order, the data logic module 502 may track the obtainment of each of the three unit of use products. Until all three unit of use products are picked from the inventory surface unit 302, the data logic module 502 may communicate with the other modules, such as the inventory coordination module 504, to ensure that the order is filled. Once all three unit of use products are picked from the inventory surface unit 302, the data logic module 502 determines that the order is filled and addresses a next order to be filled.

The inventory coordination module 504 may communicate with the data logic module 502 to obtain order information about the type of unit of use product needed to fill the the processing at the map module 508 is communicated to the robotics module 510. Specifically, once the data logic module 502 coordinates with the inventory coordination module 504 about the type and number of unit of use products needed for an order, the robotics module 510 utilizes location information stored by the map module 508 to determine proper commands for the inventory pick unit 306. The map module 508 can calculate and store coordinates understandable by the programmable picking apparatus 320, including needed angles of orientation for the movable arm(s) 324 and picker 326 to grasp the unit of use product. An example of location information from the map module 508 is shown in Table 1 below.

TABLE 1

| Product UPC | L | W | H | Vision System Location | | Surface Velocity | Robot Calculated Movement | | | | | Velocity Offset | Move Velocity | | | Pick (1 Y 0 N) |
|---|---|---|---|---|---|---|---|---|---|---|---|---|---|---|---|---|
| | | | | $X^{in}$ | $Y^{Puls-s}$ $Q°$ | | $O°$ | X | Z | Vms | Offset | | X | Y | Z | |
| 12345678910 | 3 | 1 | 1 | 310 | 452,000  32 | 60 | 32 | 11 | 40 | 22 | −.2 | 0 | 100 | 100 | 50 | 1 |
| 0123456789 | 4 | 2 | 3 | 345 | 441,000  12 | 67 | 12 | 46 | 40 | 23 | −.1 | 0 | 100 | 100 | 50 | 1 | patient-specific order. The inventory coordination module 504 stores inventory quantities of unit of use products present at the surface area 310 and updates the inventory quantities as unit of use products are added to or picked from the inventory surface unit 302. Multiple orders may be placed in multiple queues and multiple orders from the queue may be processed simultaneously so that the inventory pick unit 306 can be optimized. That is, the inventory coordination module 504, for example, can utilize information on the locations of unit of use products to determine which of the unit of use products are picked to fill multiple orders from the queues.

The imaging module 506 can analyze image data received from the inventory identification unit 304 and provide the analysis to other modules 502, 504, 508-514. Specifically, unit of use products on the inventory surface unit 302 may be identified by analyzing the image data from the inventory identification unit 304. The imaging module 506 may identify the unit of use products by recognizing the exterior shape or exterior features of the unit of use products, including colors, shapes such as images on the package, or markings such as text, by recognition of interior properties through an x-ray or similar technology, or by reading a bar code on the exterior of the unit of use products, for example. Once identified, the type and quantity of available unit of use products are logged via the inventory coordination module 504. The identification of the unit of use products also facilitates determining the location of the unit of use products at the surface area 310 with the aid of the map module 508 and the product attributes module 514, as described below.

The map module 508 can locate and store positions of the unit of use products as they lie at the surface area 310. The map module 508 may communicate with the encoder 318 to determine velocity and location of the unit of use products. The map module 508 may communicate with the imaging module 506 to receive information about the unit of use products, such as orientation, bar code and/or dimensions and shape. Coordinates or location information for the unit of use products at the surface area 310 may be stored (e.g., in memory) until needed to fill an order received by the data logic module 502. The location information resulting from Rather than configuring dedicated inventory space with a rigid orientation of products, the map module 508 may identify the orientation and location of the unit of use products as they lie at the surface area 310. Utilizing the orientation and location of the many types of unit of use products as they lie provides knowledge of the state of the inventory without elaborate monitoring systems to monitor depletion from shelves.

The robotics module 510 may utilize the information from the map module 508 to generate commands for the operation of the programmable picking apparatus 320. The commands may include commands to rotate the picker 326 or control an axis of the movable arm(s) 324, for example. Use of information from the encoder 318, the supplemental image camera 322 and/or the inventory identification unit 304, for example, provides the coordinates needed to instruct the programmable picking apparatus 320 to pick the unit of use products from the surface area 310 in their unordered state.

The communication module 512 may communicate information to the modules 502-510, 514, the inventory surface unit 302, the inventory identification unit 304, the inventory pick unit 306, and the label unit 308. In general, the communication module 512 manages wireless and wired telecommunications such as receipt and transmission of data and commands through, for example, an intranet or other electrical communication lines. The communication module 512 may manage communication with exterior networks. As an example, the communication module 512 can communicate with accounting and purchasing modules (not shown) to pay purchase orders and/or reorder more products as the inventory coordination module 504 signals a predetermined amount of depletion of unit of use products.

The product attributes module 514 may store attributes of numerous types of unit of use products encountered by the system 100. The product attributes include one or more of exterior dimensions, weight, center of gravity, product pick location (e.g product's center). The imaging module 506, the map module 508, and the robotics module 510 may call upon the product attributes module 514 to provide information integral for determining the location and process of picking the unit of use products. In some embodiments, when the imaging module 506 utilizes shape recognition, the attributes of the unit of use products from the product attributes module 514 are called upon for comparison.

As the unit of use products pass by the inventory identification unit 304, image data is obtained and analyzed by the imaging module 506, with support from the map module 508 and the product attributes module 514 as described above, to identify the type, size and orientation of the unit of use products. The map module 508 logs the position of the unit of use products at the surface area 310 for the robotics module 510 to develop pick parameters for movements of the programmable picking apparatus 320 to pick the unit of use products. The unit of use products' location and corresponding pick parameters are stored at least until needed. In some embodiments, the pick parameters are subsequently sent to the programmable picking apparatus 320.

Once the data logic module 502 receives one or more orders for the unit of use product, the data logic module 502 collaborates with the inventory coordination module 504 to identify the unit of use products at the surface area 310 that meet the needs of the order. When the unit of use product passes within reach of the inventory pick unit 306, the programmable picking apparatus 320 picks the unit of use product from the surface area 310 and releases it to the label unit 308. The label unit 308 then labels the unit of use product with a patient-specific label. The data logic module 502 updates the order status and the inventory coordination module 504 updates its inventory quantities.

Other updates may occur when unit of use products in the vicinity of a previous pick pass by the inventory identification unit 304. Specifically, since the movable arm(s) 324 or picker 326 may disturb surrounding unit of use products, the inventory identification unit 304 refreshes the image data and analyzes the refreshed image data to update location and orientation information.

Figure 6:
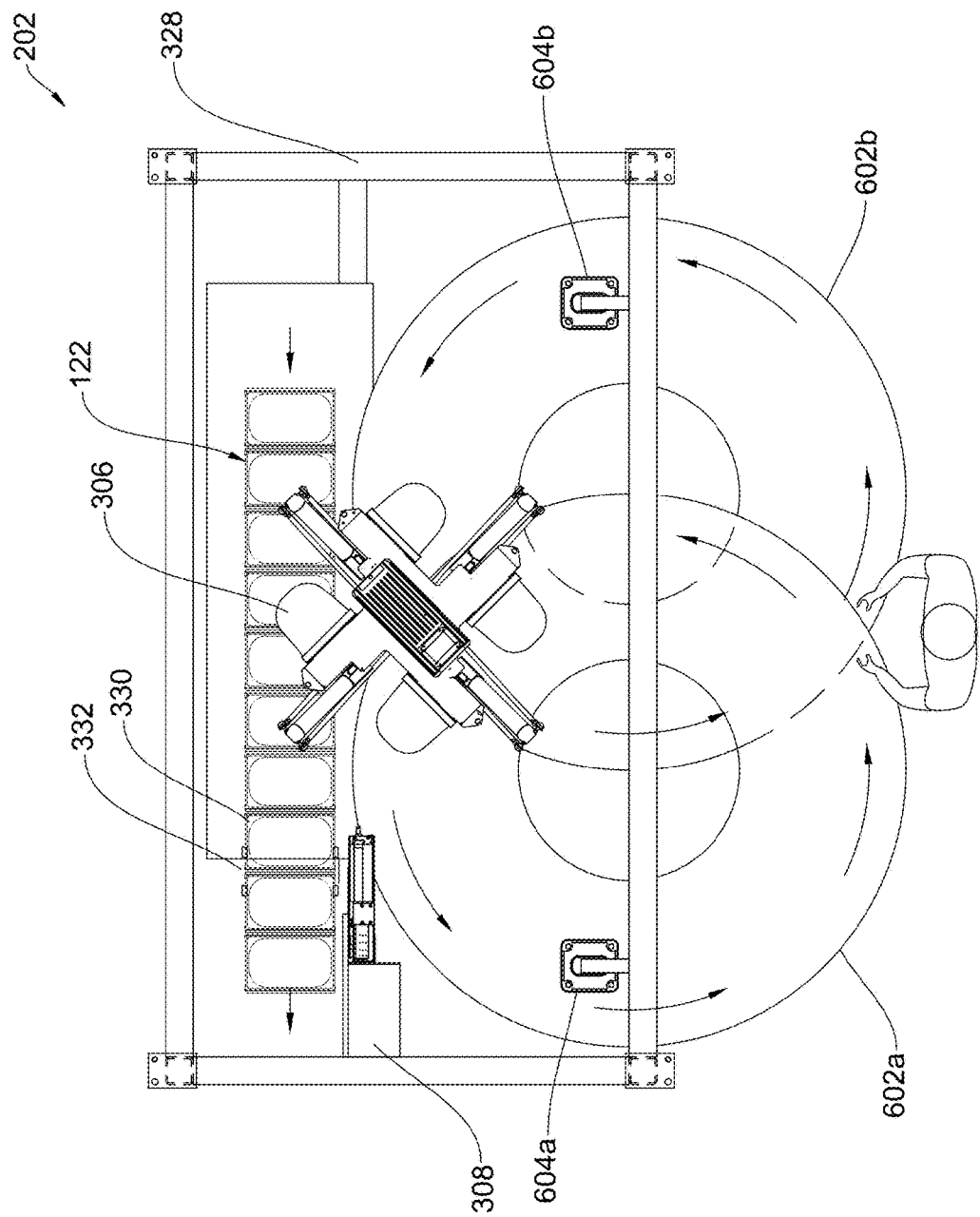
FIG. 6 is a schematic representation of a product inventory subsystem that may be deployed within the unit of use device of FIG. 2, according to an example embodiment.

FIG. 6 illustrates a product inventory component 202 that includes dual inventory surface units 602a, 602b. The inventory surface units 602a, 602b are disc shaped and overlap one another. The first inventory surface unit 602a is disposed above the second inventory surface unit 602b. Specifically, a point of an outer perimeter of the first inventory surface unit 602a may be located at about a center of the second inventory surface unit 602b. The centers of the inventory surface units 602a, 602b may be located farther apart to provide more area that is accessible by the inventory pick unit 306. A point of an outer perimeter of the second inventory surface unit 602b may be located at about a center of the first inventory surface unit 602a. The inventory pick unit 306 is positioned above the inventory surface units 602a, 602b so as to have a portion proximal the inventory surface units 602a, 602b to pick unit of use products from both inventory surface units 602a, 602b. The inventory pick unit 306 delivers the unit of use product to the label unit 308 and then drops the unit of use product into the packing device 122.

Figure 7:
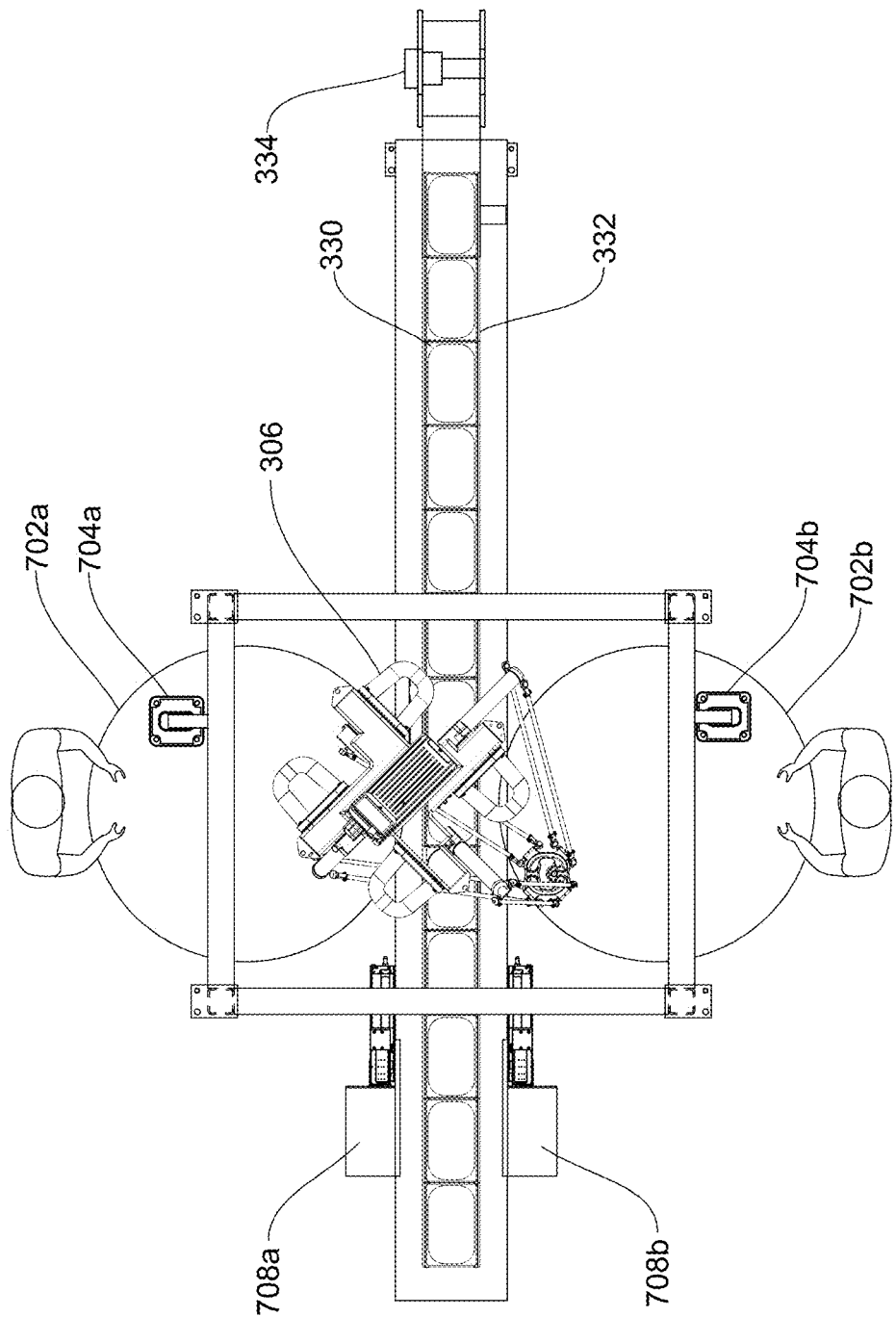
FIG. 7 is a schematic representation of a product inventory subsystem that may be deployed within the unit of use device of FIG. 2, according to an example embodiment.

FIG. 7 illustrates an embodiment of the product inventory component 202 with dual inventory surface units 702a, 702b. Upper surfaces of the inventory surface units 702a, 702b lie in substantially the same plane. Pouches 330 are moved between the inventory surface units 702a, 702b. Dual inventory identification units 704a, 704b are placed on either side of the inventory pick unit 306. The inventory pick unit 306 is positioned above the packing device 122. The inventory pick unit 306 is positioned to pick unit of use products from both inventory surface units 702a, 702b. Dual label units 708a, 708b are provided on either side of the conveyor 332. That is, the first label unit 708a is positioned adjacent the first inventory surface unit 702a and the second label unit 708b is positioned adjacent the second inventory surface unit 702b. The inventory pick unit 306 can reach and label the unit of use products with either label unit 708a, 708b.

Figure 8:
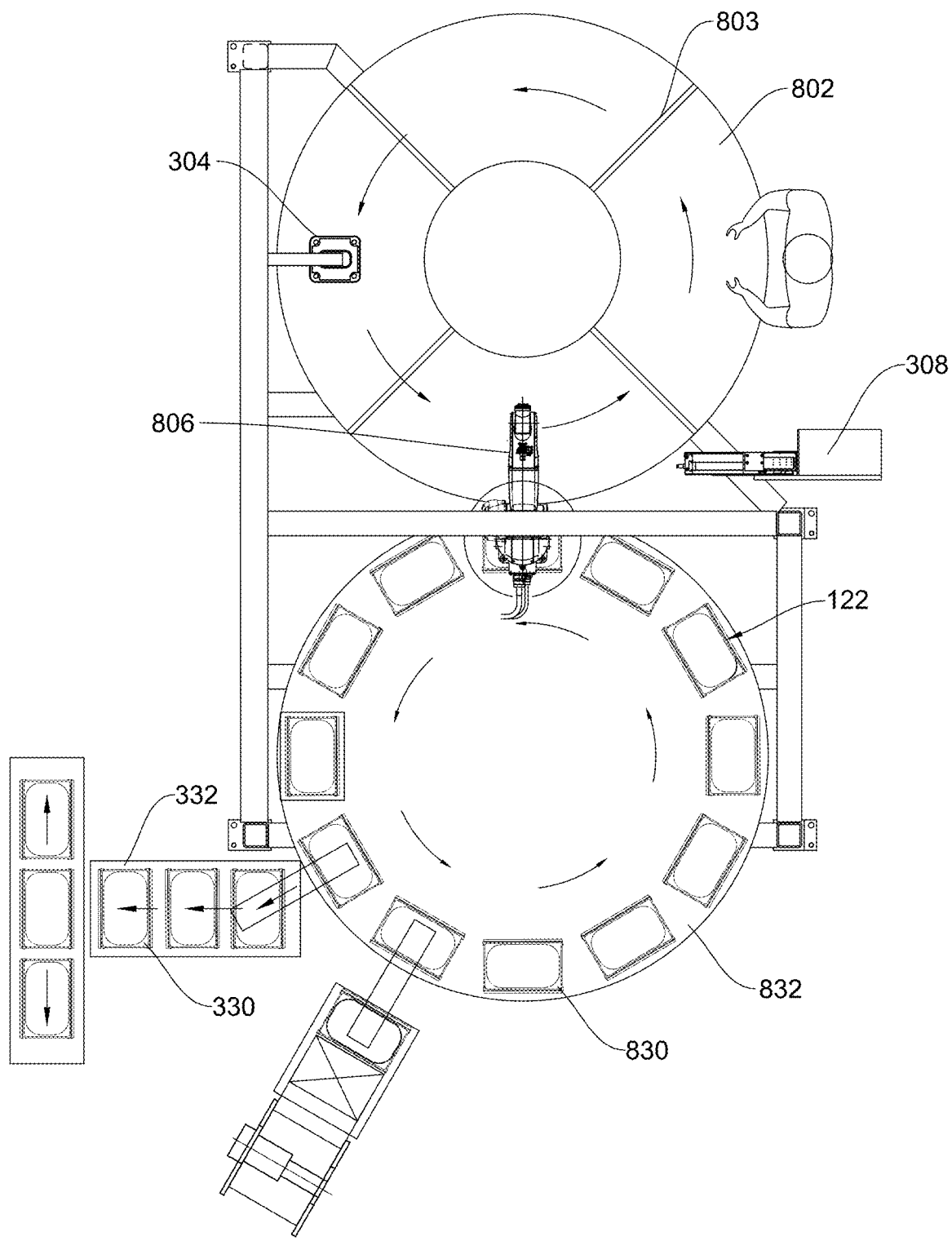
FIG. 8 is a schematic representation of a product inventory subsystem that may be deployed within the unit of use device of FIG. 2, according to an example embodiment.

FIG. 8 illustrates a single, disc-shaped inventory surface unit 802 adjacent a packing device 122 that has bins 830 on a circular packaging disc 832. The inventory surface unit 802 is divided into quadrants by dividers 803. Quadrants may be utilized such that the inventory identification unit 304 takes an image of the quadrant and sends information to the control subsystem 204. The inventory surface unit 802 rotates by quadrant, placing all known product location information in range of the inventory pick unit 806. The circular packaging disc 832 spins to provide the inventory pick unit 806 with access to empty bins 830. The spinning of the circular packaging disc 832 also allows ejection of the bins 830 at locations opposite from the inventory surface unit 802. The inventory pick unit 806 is disposed adjacent the inventory surface unit 802 and the circular conveyor 832 so as to be able to reach both, as well as reach the label unit 308. In this embodiment, the inventory pick unit 806 includes a six-axis robot. The inventory surface unit 802 may rotate in a direction opposite the circular conveyor's 832 direction of rotation.

Figure 9:
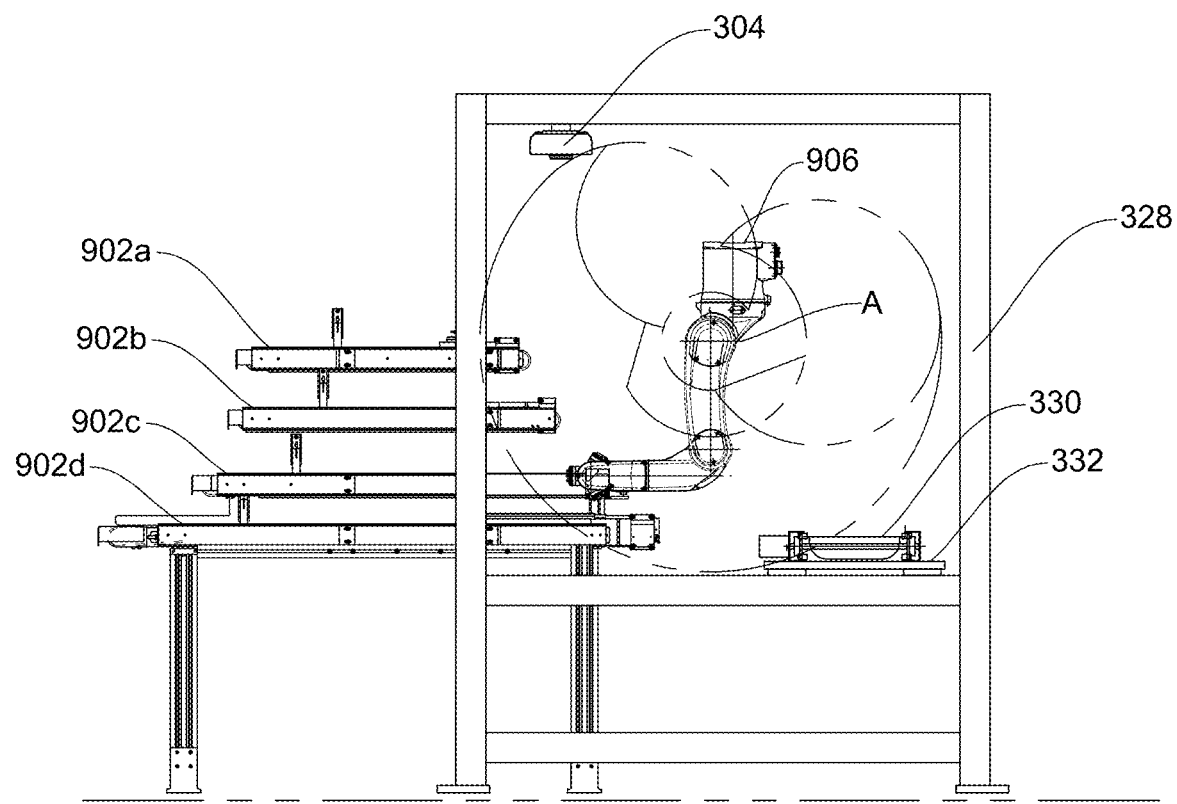
FIG. 9 is a schematic representation of a product inventory subsystem that may be deployed within the unit of use device of FIG. 2, according to an example embodiment.

FIG. 9 illustrates multiple inventory surface units 902a, 902b, 902c, 902d that are shaped as a polygon. In this embodiment, the inventory surface units 902a, 902b, 902c, 902d may reverse direction of movement. The inventory surface units 902a, 902b, 902c, 902d are tiered one above the other. That is, the inventory surface unit 902d extends toward the inventory pick unit 906 at a greater length than the inventory surface unit 902c. The inventory surface unit 902c extends at a greater length than the inventory surface unit 902b. The inventory surface unit 902b extends toward the inventory pick unit 906 at a greater length than the inventory surface unit 902a. Thus, the inventory surface units 902a, 902b, 902c, 902d provide a surface area, from which the inventory pick unit 906 may grasp a unit of use product. In the embodiment of FIG. 9, the inventory pick unit 906 includes a six-axis robot. The six-axis robot slides along an axis A shown going into the page. The six-axis robot may slide along the axis A via a bar, rail or the like that is attached to vertical supports (not shown). The inventory pick unit 906 includes a supplemental image camera 922. The supplemental image camera 922 may be connected to the movable arm 928 or picker 926 of the six-axis robot. The broken lines in FIG. 9 show the movement and reach that is possible with the six-axis robot.

Figure 10:
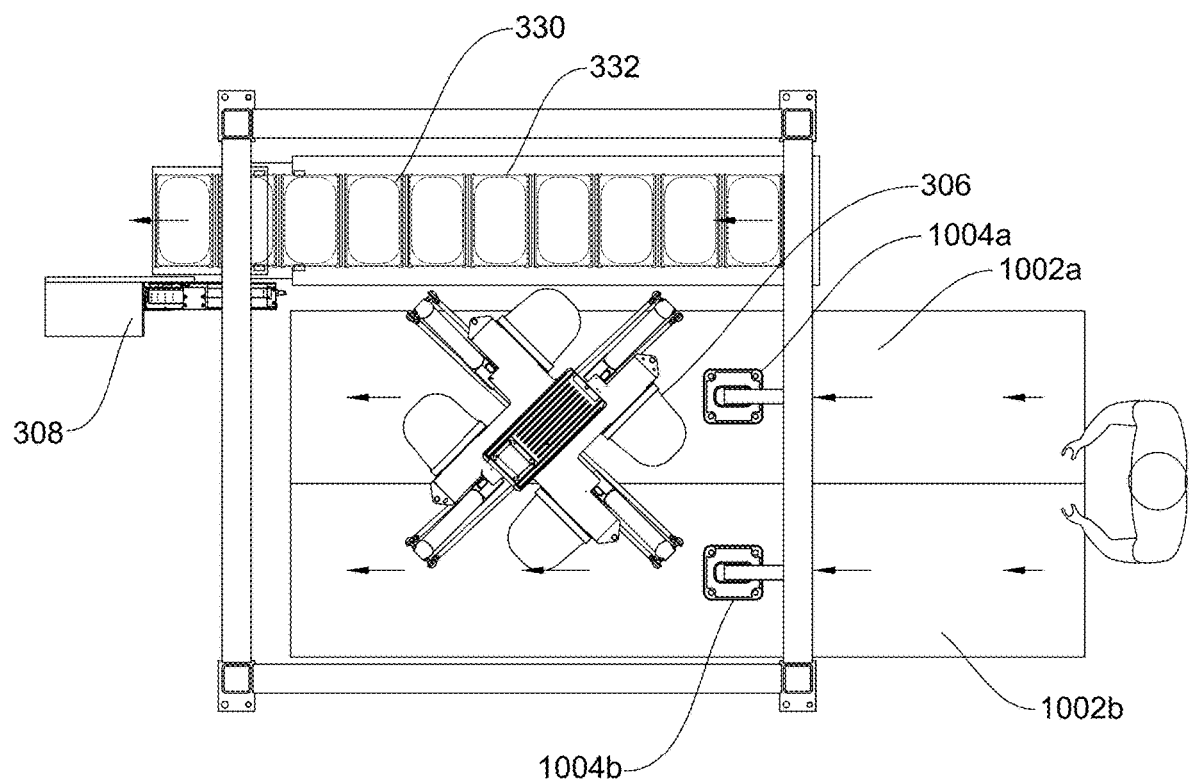
FIG. 10 is a schematic representation of a product inventory subsystem that may be deployed within the unit of use device of FIG. 2, according to an example embodiment.

FIG. 10 illustrates dual inventory surface units 1002a, 1002b that are shaped as polygons. Upper surfaces of the inventory surface units 1002a, 1002b lie in substantially the same plane. Pouches 330 are moved adjacent the inventory surface unit 1002a. Dual inventory identification units 1004a, 1004b are placed above respective inventory surface units 1002a, 1002b. The inventory pick unit 306 is positioned above the inventory surface units 1002a, 1002b. The inventory pick unit 306 is positioned to pick unit of use products from both inventory surface units 1002a, 1002b, as well as reach the pouches 330.

Figure 11:
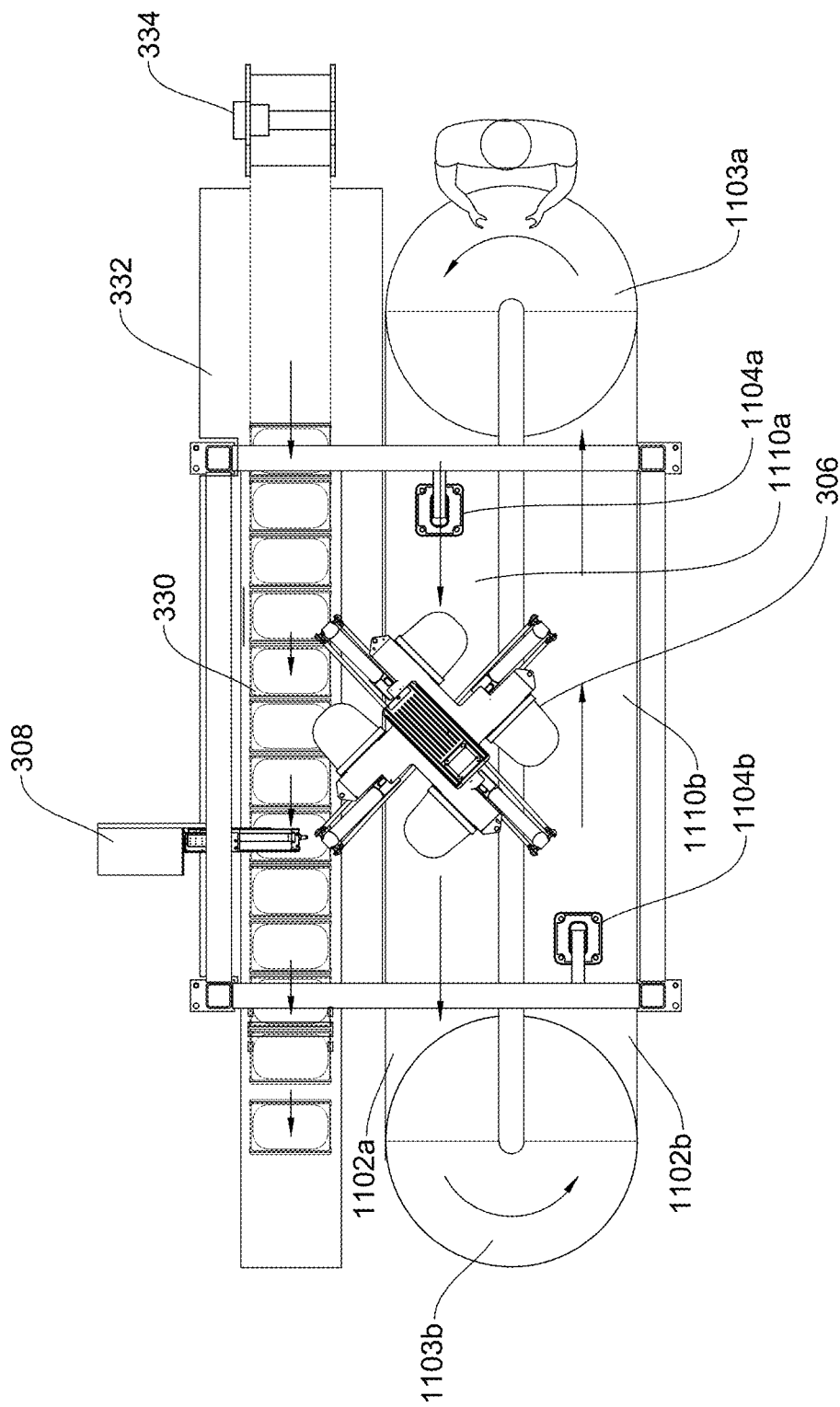
FIG. 11 is a schematic representation of a product inventory subsystem that may be deployed within the unit of use device of FIG. 2, according to an example embodiment.

FIG. 11 illustrates dual inventory surface units 1102a, 1102b that are shaped as polygons. Upper surfaces of the inventory surface units 1102a, 1102b lie in substantially the same plane. Pouches 330 are moved adjacent the inventory surface unit 1102a. Dual inventory identification units 1104a, 1104b are placed above respective inventory surface units 1102a, 1102b. The inventory pick unit 306 is positioned above the inventory surface units 1102a, 1102b so that a portion of the inventory pick unit 306 is proximal to the inventory surface units 1102a, 1102b. The inventory pick unit 306 is positioned to pick unit of use products from both inventory surface units 1102a, 1102b, as well as reach the pouches 330 for dispensing. The inventory surface units 1102a, 1102b include roundtables 1103a, 1103b and movable surface areas 1110a, 1110b. Specifically, the roundtables 1103a, 1103b are rotatable and are disposed at ends of the movable surface areas 1110a, 1110b. The first roundtable 1103a receives unit of use products from the second movable surface area 1110b and delivers unit of use products onto the first movable surface area 1110a. The second roundtable 1103b receives unit of use products from the first movable surface area 1110a and delivers unit of use products onto the second movable surface area 1110b.

Figure 12:
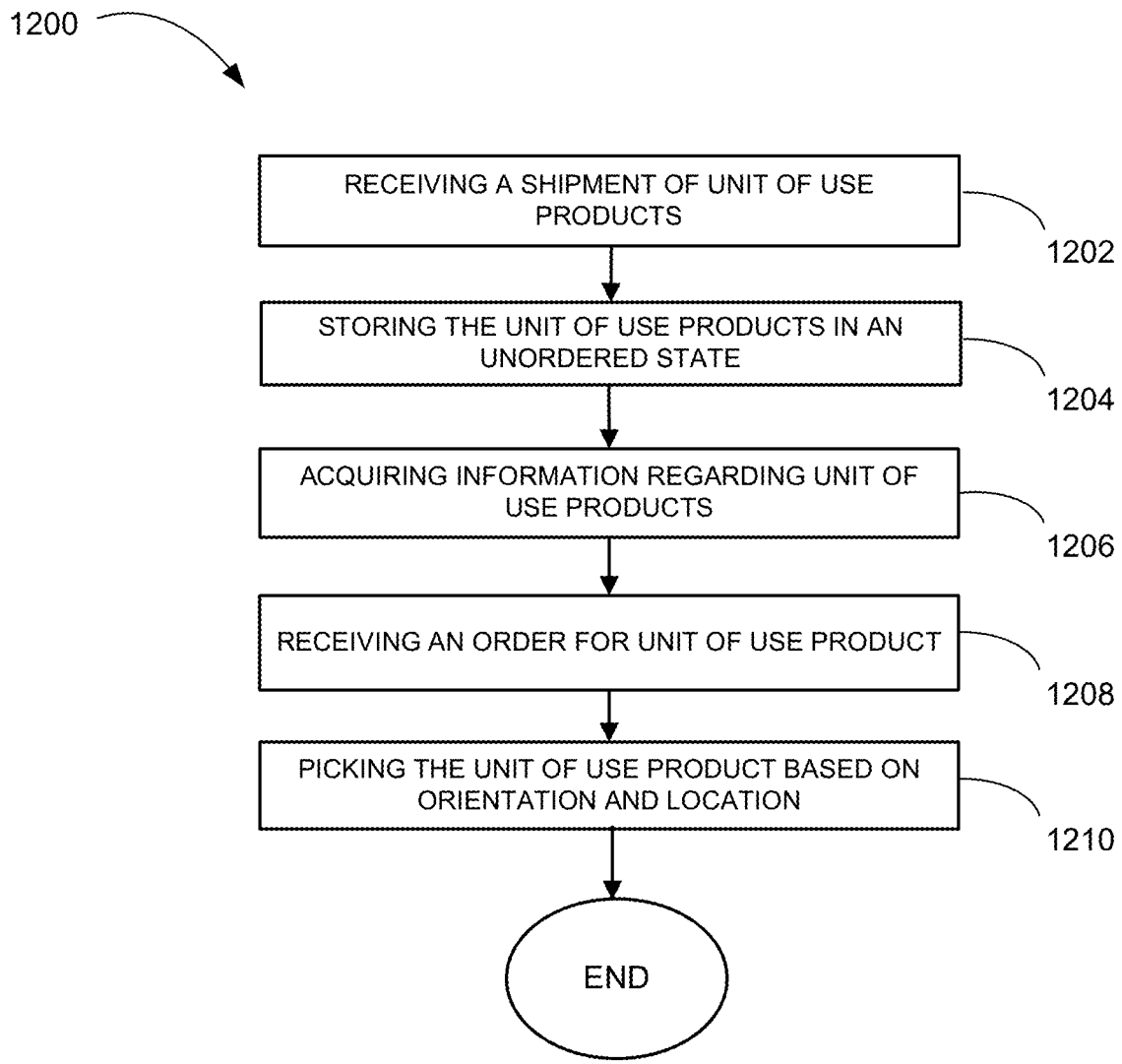
FIG. 12 is an example process flow illustrating a method for unit of use product inventory, according to an example embodiment.

FIG. 12 illustrates a method 1200 for unit of use product inventory, according to an example embodiment. The method 1200 may be performed partially by the order processing device 102, partially by the network manager device 106 and/or the unit of use device 110, or may be otherwise performed.

At block 1202, a shipment of unit of use products is received. The unit of use products may be received directly from shipping. That is, the unit of use products are not staged or warehoused for a period of time before filling an order. Rather, the unit of use products move from shipping into the inventory surface unit 302. At block 1204, the unit of use products are stored in an unordered state. The storage is open-access storage for filling an order at anytime. At block 1206, information regarding the unit of use products is acquired. The information may include type, orientation and location of the unit of use products. At block 1208, an order for a unit of use product is received. At block 1210, the unit of use product is picked based on the orientation and location.

Figure 13:
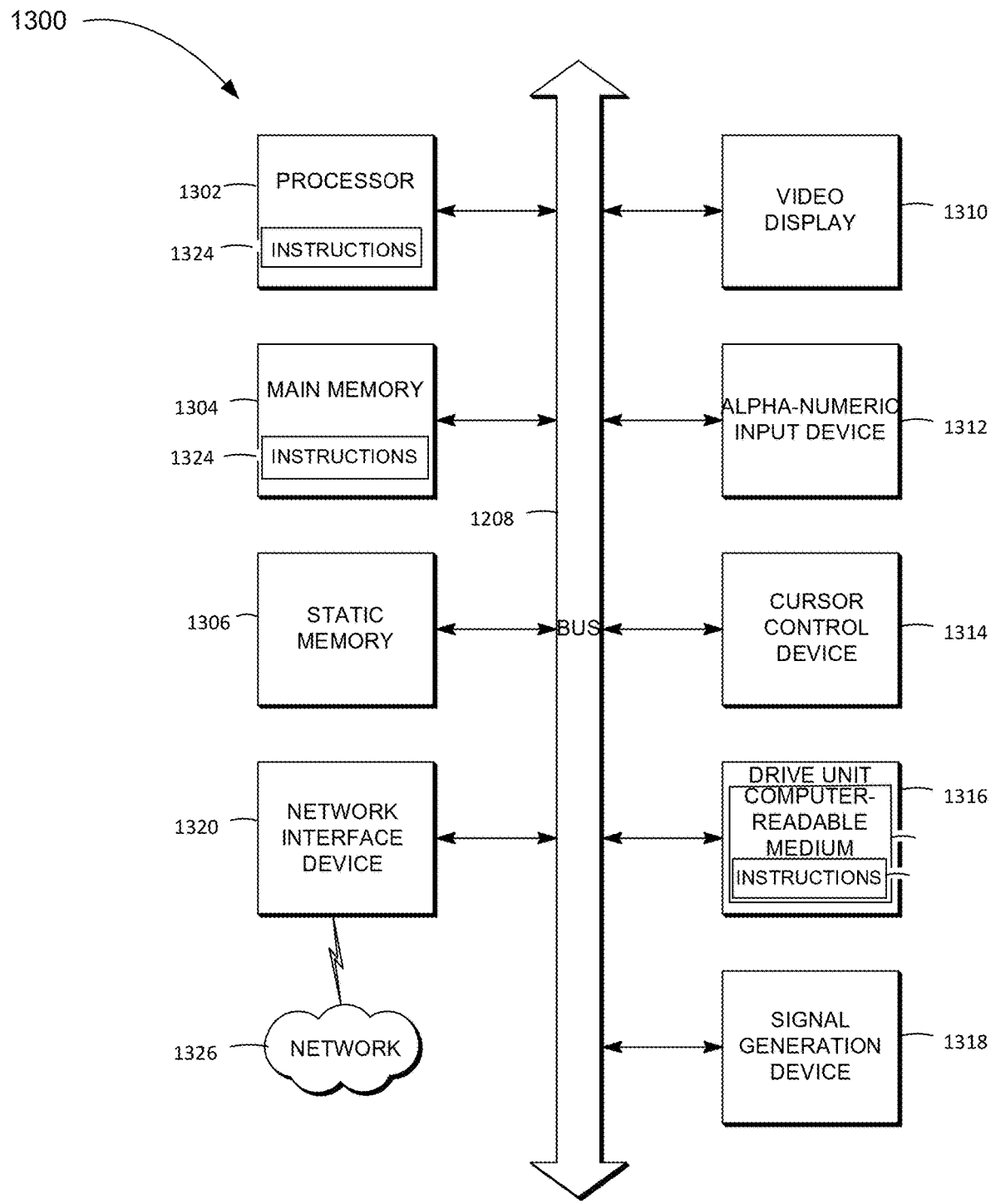
FIG. 13 is a block diagram of a machine in the example form of a computer system within which a set of instructions for causing the machine to perform any one or more of the methodologies discussed herein may be executed or stored.

FIG. 13 shows a block diagram of a machine in the example form of a computer system 1300 within which a set of instructions may be executed causing the machine to perform any one or more of the methods, processes, operations, or methodologies discussed herein. The order processing device 102, the network manager device 106 and/or the unit of use device 110 may include the functionality of the one or more computer systems 1300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU) a graphics processing unit (GPU) or both), a main memory 1304 and a static memory 1306, which communicate with each other via a bus 1308. The computer system 1300 further includes a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a drive unit 1316, a signal generation device 1318 (e.g., a speaker) and a network interface device 1320.

The drive unit 1316 includes a computer-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting computer-readable media.

The software 1324 may further be transmitted or received over a network 1326 via the network interface device 1320.

While the computer-readable medium 1322 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Unless clearly and explicitly identified otherwise, the terms "member" and "device operator" are frequently used interchangeably herein.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, an inventory surface unit retains a plurality of products in an unordered state. An inventory identification unit acquires information for an orientation, and location of the plurality of products on the inventory surface unit. The inventory identification unit is disposed above the inventory surface unit. An inventory pick unit is adapted to pick a product among the plurality of products from the inventory surface unit based on the orientation and location acquired by the inventory identification unit. The inventory pick unit is disposed proximal the inventory surface unit, and the inventory pick unit is communicatively connected to the inventory identification unit.

In an example embodiment, a shipment of products is received. The products are stored in an unordered state. Information for a type, orientation and location of the products is acquired. An order for a type of product is received. The type of product is picked based on the orientation and location.

While the present disclosure in some embodiments refers to prescription drugs and pharmacy benefits, the present disclosure is not so limited. Other health care and non-health care organizations may utilize the methods and systems for various types of inventory.

Thus, methods and systems for unit of use product inventory have been described. Although embodiments of the present invention have been described with reference to specific example embodiments, it will be evident that various modifications and changes may be made to these embodiments without departing from the broader spirit and scope of the embodiments of the invention. It should be appreciated that the methods and systems can be used with products other than unit of use products. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A drug system comprising:
   a moveable surface adapted to retain a plurality of drug packages in an unordered state being free of a logically controlled positioning, wherein the moveable surface is arranged to support and move the plurality of drug packages positioned on the moveable surface, wherein the moveable surface is adapted to support the plurality of drug packages with varying shapes, sizes, and types, the moveable surface defining a closed-loop path along which the plurality of drug packages move such that the plurality of drug packages continuously recirculate along the closed-loop path when moved by the moveable surface;
   an identification device adapted to acquire information for an orientation and a location of the plurality of drug packages moving along the closed-loop path on the moveable surface, the identification device being disposed above the closed-loop path defined by the moveable surface such that the plurality of drug packages repeatedly move past the identification device as the plurality of drug packages continuously recirculate along the closed-loop path;
   a picker adapted to obtain an individual drug package among the plurality of drug packages from the moveable surface based on a drug package orientation and a drug package location, the picker being disposed proximal to the moveable surface; and
   a controller communicatively connected to the identification device and the picker, the controller adapted to process the acquired information for the orientation and the location from the identification device and to instruct the picker to pick the individual drug package at the drug package orientation and the drug package location, wherein the drug package location depends on the movement of the moveable surface.

2. The system of claim 1, wherein the orientation and the location are defined by an angle from an axis of a defined coordinate system centered at a center of rotation of the moveable surface and a radial distance from a center of the defined coordinate system.

3. The system of claim 1, wherein the picker includes a programmable pick apparatus and a supplemental image camera connected to the programmable pick apparatus, the programmable pick apparatus including a moveable arm and a hand attached to an end of the moveable arm to grasp the individual drug package from the moveable surface, the supplemental image camera being connected to the identification device to communicate image data to verify the package location and the package orientation of the individual drug packages prior to grasping and confirm that the programmable picking apparatus has obtained the individual drug packages after grasping.

4. The system of claim 1, further comprising:
   a packing device adapted to receive the plurality of drug packages, the packing device being adapted to prepare the plurality of drug packages for shipping with the plurality of drug packages including packages of varying shapes and sizes.

5. The system of claim 4, wherein the packing device includes a circular packaging disc configured to receive and to support picked packages from the moveable surface.

6. The system of claim 4, wherein the packing device includes a linear conveyor.

7. The system of claim 4, wherein the packing device includes a film dispenser and is positioned to receive picked packages from the moveable surface.

8. The system of claim 1, wherein the moveable surface is disc shaped and rotatable, and wherein the picker removing a first product of the plurality of drug packages disturbs a second product of the plurality of drug packages, and wherein the identification device is configured to reacquire information for the orientation and the location of the second product moving on the moveable surface.

9. The system of claim 1, wherein the moveable surface is polygonal shaped.

10. The system of claim 1, further comprising a label unit to label the plurality of the drug packages, the label unit being positioned within an area reachable by the picker.

11. The system of claim 1, wherein the moveable surface is divided into quadrants with dividers.

12. The system of claim 1, wherein the picker includes a six-axis robotic arm.

13. A fulfillment system comprising,
   a support surface adapted to retain a plurality of drug packages in an unordered state, wherein the support surface includes a moveable surface that supports and moves the plurality of drug packages, wherein the moveable surface is adapted to support drug packages varying in shape and size;
   an identification device adapted to acquire information for a detected orientation and a detected location of the plurality of drug packages moving on the moveable surface of the support surface, the identification device being disposed above the support surface;

an inventory picker adapted to obtain an individual package from among the plurality of drug packages on the support surface based on a projected orientation and a projected location said individual package will have as the moveable surface moves, the inventory picker being disposed proximal to the support surface; and a controller communicatively connected to the identification device and the inventory picker, the controller adapted to process the acquired information for the detected orientation and the detected location from the identification device to generate the projected orientation and the projected location and to instruct the inventory picker to obtain the individual package at the projected orientation and the projected location, wherein the controller is adapted to generate the projected orientation and the projected location by extrapolation based on the detected orientation and the detected position and the movement of the moveable surface after the detected orientation and the detected position were acquired by the identification device.

14. The system of claim 13, wherein the plurality of drug packages includes at least one drug manufacture packaged drug product that has been sealed and closed at a direction of a drug manufacturer that manufactured drug contained with the drug manufacture packaged drug product.

15. The system of claim 13, wherein the identification device is adapted to reacquire information for the detected orientation and the detected location of a first package moving on the moveable surface of the support surface after the inventory picker disturbs the first package by altering at least one of an orientation of the first package on the moveable surface or a location of the first package on the moveable surface.

16. The system of claim 13, wherein the controller determines the projected location relative to a defined coordinate system mapped onto the moveable surface.

17. The system of claim 13, wherein the inventory picker includes a programmable pick apparatus and a supplemental image camera connected to the programmable pick apparatus, the programmable pick apparatus including a moveable arm and a grasper attached to an end of the moveable arm to select the package from the support surface, the supplemental image camera being connected to the identification device to communicate image data to verify a position of the package prior to picking and confirm that the programmable picking apparatus has obtained the package after selecting.

18. A system comprising:
a support surface adapted to retain a plurality of drug packages in an unordered state being free of a logically controlled positioning, wherein the support surface includes a moveable surface that visibly supports and moves the plurality of drug packages positioned on the moveable surface, wherein the moveable surface is a continuous surface to repeatedly move one of the plurality of drug packages and is adapted to support the plurality of drug packages with varying shapes, sizes, and types;

an inventory identification unit adapted to acquire information for a detected orientation and a detected location of the plurality of drug packages moving on the moveable surface of the support surface, the inventory identification unit being disposed above the support surface with the plurality of drug packages on the moveable surface repeatedly moving past the inventory identification unit until ordered;

a picker adapted to obtain an individual package among the plurality of drug packages from the moveable surface based on a projected orientation and a projected location said individual package will have relative to the picker, the picker being disposed proximal to the support surface; and a control subsystem communicatively connected to the inventory identification unit and the picker, the control subsystem adapted to process the acquired information for the detected orientation and the detected location from the inventory identification unit to generate the projected orientation and the projected location and to instruct the picker to pick an ordered, individual package at the projected orientation and the projected location, wherein the detected location, relative to the picker, is different than the projected location when the detected location is acquired by the inventory identification unit.

19. The system of claim 18, wherein the moveable surface provides open access storage of the plurality of drug packages on the support surface while the plurality of drug packages is retained in the unordered state with the plurality of drug package being open upwardly above and horizontally outwardly from the moveable surface so the inventory identification unit images the plurality of drug packages from above, laterally, or both.

20. The system of claim 19, wherein the picker is positioned outside the perimeter of the moveable surface and configured to extend over the moveable surface to pick the individual package and not interfere with the inventory identification unit imaging the plurality of drug packages on the moveable surface.

21. The system of claim 20, wherein the moveable surface has an annulus shape with an inner edge and an outer edge, wherein the moveable surface includes an inner guard along the inner edge and an outer guard along the outer edge.

* * * * *